(12) United States Patent
Wang et al.

(10) Patent No.: US 7,792,026 B2
(45) Date of Patent: Sep. 7, 2010

(54) METHOD OF CALCULATING A TIME PERIOD TO WAIT FOR MISSING DATA PACKETS

(75) Inventors: Xin Wang, Parsippany, NJ (US); Tomas S. Yang, Parsippany, NJ (US); Yang Yang, Parsippany, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1144 days.

(21) Appl. No.: 11/356,022

(22) Filed: Feb. 17, 2006

(65) Prior Publication Data

US 2007/0195826 A1     Aug. 23, 2007

(51) Int. Cl.
G06F 11/30     (2006.01)
(52) U.S. Cl. .................. 370/230; 370/229; 709/230; 713/500; 713/501; 713/502; 713/503; 713/600; 713/601; 714/699; 714/746; 714/748
(58) Field of Classification Search .................. 370/464, 370/469, 503, 516, 517, 229, 351, 359; 709/230; 714/699, 746, 748; 713/500, 501, 502, 503, 713/600, 601
See application file for complete search history.

(56) References Cited

U.S. PATENT DOCUMENTS

| | | | | |
|---|---|---|---|---|
| 6,629,285 | B1* | 9/2003 | Gerendai et al. | 714/748 |
| 2002/0004842 | A1* | 1/2002 | Ghose et al. | 709/235 |
| 2002/0124096 | A1* | 9/2002 | Loguinov et al. | 709/230 |
| 2002/0141338 | A1* | 10/2002 | Burke | 370/229 |
| 2003/0181214 | A1* | 9/2003 | Grob et al. | 455/515 |
| 2003/0227875 | A1* | 12/2003 | Wei et al. | 370/252 |
| 2004/0184488 | A1* | 9/2004 | Bauer et al. | 370/517 |
| 2005/0220032 | A1* | 10/2005 | Hu | 370/244 |
| 2006/0104279 | A1* | 5/2006 | Fellman et al. | 370/392 |
| 2007/0002836 | A1* | 1/2007 | Lindner | 370/352 |

* cited by examiner

Primary Examiner—William Trost, IV
Assistant Examiner—Charles C Jiang
(74) Attorney, Agent, or Firm—Harness, Dickey & Pierce, P.L.C.

(57) ABSTRACT

A method of receiving data packets. In the method of receiving data packets, a determination is made as to whether a received data packet is received out of an expected order. If the determining step determines a received packet is out of the expected order, a time period is calculated to wait for one or more missing data packets based at least in part on an expected time of receiving the one or more missing data packets.

18 Claims, 2 Drawing Sheets

METHOD OF CALCULATING A TIME PERIOD TO WAIT FOR MISSING DATA PACKETS

BACKGROUND OF THE INVENTION

1. Field of the Invention

Example embodiments of the present invention relate generally to a method of receiving data packets, and, more particularly, to a method of receiving out-of-order data packets.

2. Description of the Related Art

In conventional packet switched communication networks, packets transmitted in a given scheduling order are often received out-of-order. For example, if a sending unit (e.g., a base station, a mobile station, a radio network controller, etc.) sends three data packets in an order [1, 2, 3] and a receiving unit (e.g., a base station, a mobile station, a radio network controller, etc.) receives the three data packets in an order [2, 3, 1], the three data packets are said to be out-of-order.

The phenomenon of out-of-order data packets may be caused by any number of reasons. Such reasons may include a plurality of physical or logical links connecting the sending unit and the receiving unit such that different data packets are sent along different physical/logical links, different distances associated with one or more of the plurality of physical/logical links, different scheduling delays associated with one or more of the plurality of physical/logical links, etc. In another example, data packets may truly be "lost", for example due to interference present on one or more of the plurality of physical/logical links.

In an example, a wireless communication system may include a plurality of physical links (e.g., Tls, Els, etc.) connecting a base station (BS) with a radio network controller (RNC). The plurality of physical links may be associated with different distances and/or different routes each with different associated delays (e.g., processing delays, propagation delays, etc.). The wireless communication system may also include a plurality of wireless or "air interface" links (e.g., channels, hand-off legs, etc.) associated with different associated delays (e.g., processing delays, propagation delays, etc.) and data transmission/reception rates.

In many commonly used wireless communication protocols (e.g., a radio link protocol (RLP)), upper layer or higher layer functionality depends upon receiving an ordered set of data packets. In other words, the order of the data packets is a factor in proper data extraction at a higher layer. In systems employing such wireless communication protocols, if data packets are received out-of-order, the receiving unit interprets the out-of-order data packet as an indicator of one or more missing data packets (e.g., intervening data packets expected between a previously received data packet and the out-of-order data packet), and sends a non-acknowledgment (NACK) to the sending unit to prompt the sending unit to resend the missing data packet or packets. Alternatively, if the missing data packet is received within a fixed time period after the out-of-order data packet is detected at the receiving unit, the NACK is not sent and the "missing" data packet is transferred to the upper layer for further processing.

SUMMARY OF THE INVENTION

An example embodiment of the present invention is directed to a method of receiving data packets. In the method of receiving data packets, a determination is made as to whether a received data packet is received out of an expected order. If the determining step determines a received packet is out of the expected order, a time period is calculated to wait for one or more missing data packets based at least in part on an expected time of receiving the one or more missing data packets.

In an example, the expected order data packets are buffered and outputted either when the calculated time period expires or earlier if all the missing data packets are received before the calculated time period expires. If all of the missing data packets are not received before the calculated time period expires, a non-acknowledgment (NACK) may be sent for at least one of the missing data packets.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

In order to better understand the present invention, a conventional data packet receiving process will be described, followed by a data packet receiving process according to an example embodiment of the present invention.

Conventional Data Packet Receiving Process

Figure 1:
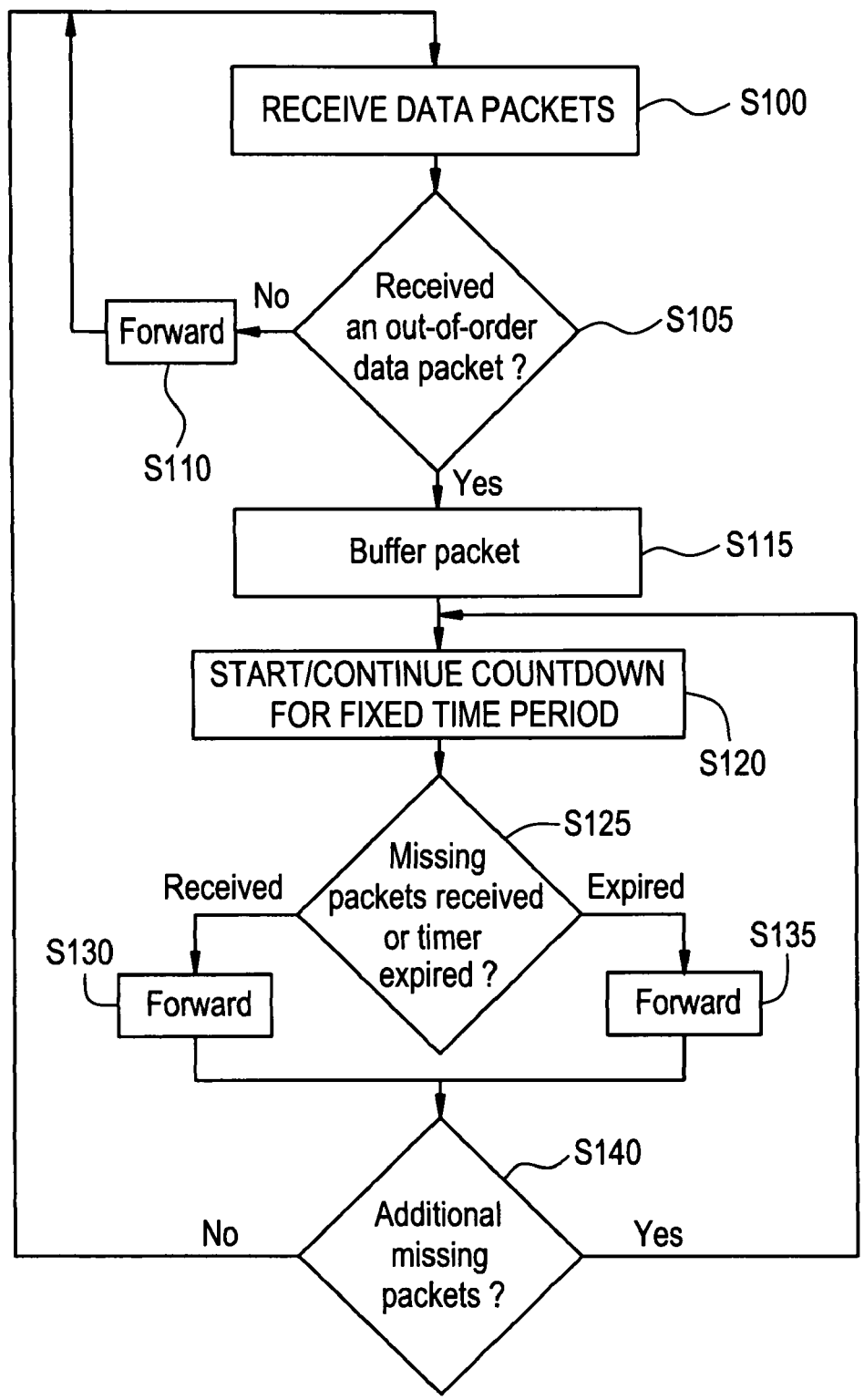
FIG. 1 illustrates a conventional data packet receiving process.

FIG. 1 illustrates a conventional data packet receiving process. In particular, FIG. 1 illustrates a conventional receiving process for recovering from an out-of-order data packet, which may alternatively be referred to as a "deskew" process.

Referring to FIG. 1, in step S100, a receiving unit (e.g., a base station, a mobile station, etc.) receives data packets from a sending unit (e.g., a base station, a mobile station, etc.). Each of the received data packets is analyzed in step S105 to determine whether the received data packet is received in order. If an out-of-order data packet is detected, an intervening data packet or packets expected between a previous received data packet and a latest received data packet are determined to be "missing". If at least one missing data packet is determined in step S105, the process advances to step S115. Otherwise, if the latest received data packet is determined to be received in a proper order, the process forwards the received data packet to an upper layer in step S110 and then returns to step S100 and waits for additional received data packets.

In step S115, the receiving unit buffers (e.g., stores in local memory) the out-of-order data packet. Then, in step S120 the receiving unit begins a countdown from a timer with a fixed time period. In step S125, the receiving unit determines whether the missing data packets have been received or if the timer has expired. If the missing data packets have been received, then upon receipt of the missing data packets, the data packets in the buffer forming a sequence are forwarded in step S130 to the upper layers. As will be appreciated, while the data packets are being buffered because of a first set of missing data packets or missing data packet, another set of missing data packets may result. Accordingly, the data packets up to this next set of missing data packets are forwarded to the upper layers.

Alternatively, if the timer expires without having received all of the missing data packets in the current set, then in step S135, the data packets up to another set of missing data packets are forwarded to the upper layers. As will be appreciated, the upper layers will receive a sequence of data packets with at least one gap or hole in the sequence (i.e., the missing data packet or packets). The upper layers of the receiving unit determine whether or not to send a non-acknowledgment (NACK) to the sending unit to prompt the sending unit to retransmit any missing data packet(s) not received. For example, if the received data packets are associated with a streaming video application, the NACK may not be sent and a video and/or audio portion of the video application output appears as a "glitch" in the output, which may be more desirable to users than experiencing delays in the streaming video application. For less delay sensitive data, the receiving unit may send a NACK for the missing data packets. In an example, if the receiving and sending units are operating in accordance with Radio Link Protocol (RLP), a NACK may be sent for individual missing data packets. Alternatively, in other protocols, the NACK may be used to designate a plurality of data packets for retransmission.

In step S140, the receiving unit determines if another set of missing packets or packet exists. If so, then processing returns to step S120 wherein the timer is set again, and the above described process repeats. It will be understood that in this situation, the received data packets continue to be buffered. However, if there are no more missing data packets, the buffer will be empty, and processing returns to step S100.

In an alternative embodiment, instead of forwarding data packets up to the next set of missing data packets in steps S130 and/or S135, all the data packets in the buffer are forwarded. This alternative embodiment may be used for real-time or streaming applications, which consider lower data latency to be a higher priority than receiving a data transfer with fewer missing data packets. As such, the methodology employed may depend on the delay sensitivity of the data, wherein the process of FIG. 1 is used for delay insensitive data, and the alternative embodiment is used for delay sensitive data.

As yet another alternative, a separate timer may be maintained for each set of missing data packets, and the process of steps S125-135 may be carried out with respect to each set.

It will be appreciated that in the above-described conventional data packet receiving process, the determination of the fixed time period of the countdown process is an important design characteristic. For example, if the fixed time period for the timer is set too low, an increased number of retransmissions are triggered, which increases wireless traffic, interference and/or delays associated with data transfer. Alternatively, if the fixed time period for the timer is set too high, performance may be degraded because, in a worst case scenario, the higher layer must wait until the countdown process completes before receiving the buffered data packets, thereby increasing delays associated with the data transfer.

Determining the appropriate time period for the fixed time period is conventionally performed by empirical study. A given time period associated with an expected or observed best average performance is typically selected for the fixed time period.

Example Data Packet Receiving Process

The "ideal" duration for the fixed time period is not necessarily static, and may change based on one or more operational characteristics of a wireless communication system. Therefore, the use of a fixed time period for the timer does not provide for the most efficient data transfer process.

Figure 2:
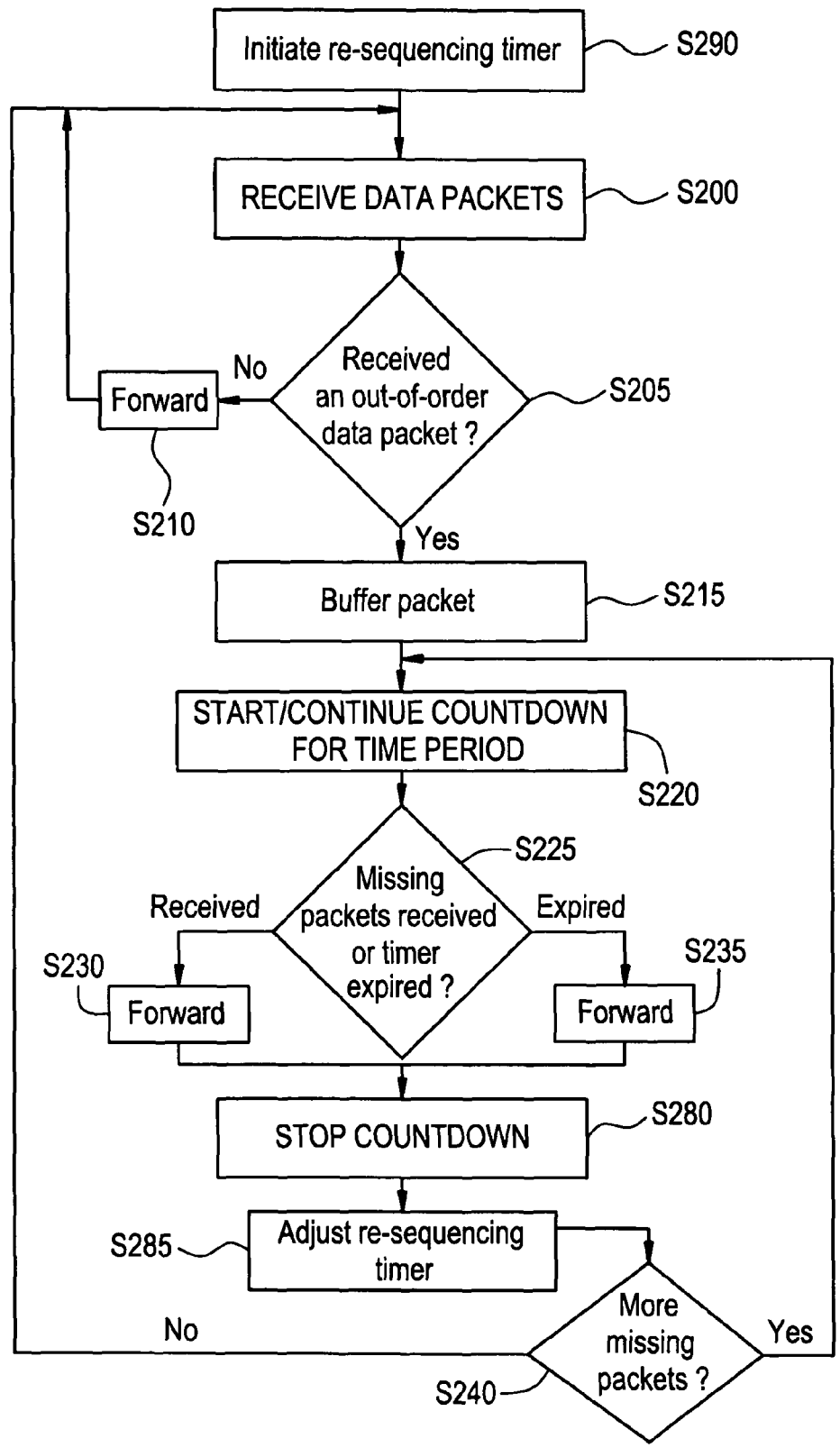
FIG. 2 illustrates a data packet receiving process according to an example embodiment of the present invention.

FIG. 2 illustrates a data packet receiving process according to an example embodiment of the present invention. Portions of the example data packet receiving process of FIG. 2 are identical to the conventional process of FIG. 1, or the alternatives thereof, except for adding steps S280, S285 and S290 as will now be described, and replacing step S120 with step S220. Accordingly, the steps S200, S205, S210, S215, S225, S230, S235, and S240 are performed as the steps S100, S105, S100, S115, S115, S130, S135 and S140 as described above with respect to FIG. 1. Therefore, although one or more of steps S200, S205, S210, S215, S225, S230, S235, and S240 may be mentioned below, a detailed description of these steps has been omitted for the sake of brevity.

In step S290, receiving unit determines a dynamic time period for use in a first or initial count down process as described in detail below; and in step S220, a count down timer, counting down the first or initial dynamic time period is started. Generally, as opposed to employing a timer with a fixed time period as in the conventional art, the receiving unit dynamically calculates a time period for the timer based on recent and/or current operating metrics.

When the count down process of steps S220-S235 ends, the timer is stopped in step S280. For example, the timer is stopped so as to determine a "hole duration", which is a time duration between the count down starting in step S220 and finally receiving the "missing" data packets indicated by the out-of-order data packet (step S205). Hole durations will be described later in greater detail.

After the timer is stopped in step S280, the dynamic time period for the timer is adjusted in step S285 if the missing packets were determined to be received in step S225 and forwarded to the upper layer in step S230. In other words, the receipt of the missing data packets triggers the dynamic time period adjustment of step S285. Example methodologies for determining the adjustments to the dynamic time period (step S285) will be described in greater detail later.

At a next step S220 after a next out-of-order packet is received in step S205, the time period for the timer is set to the dynamic time period calculated in the previous step S285.

In an alternative example embodiment of the present invention, the timer continues to run and monitor time duration even after the timer expires and the count down process terminates. Thus, in this example embodiment, steps S280 and S290 are not performed. In this example embodiment, while not illustrated in FIG. 2, if the receiving unit receives the missing data packet(s) after the timer expiration (e.g., at a next step S200), the receiving unit may optionally forward the received missing data packets or "holes" to the upper layer.

For example, if the received missing data packets are received before a retransmission of the missing data packets and the missing data packets are not associated with a time-sensitive or streaming application, the receiving unit forwards the received missing data packets or holes to the upper layer. In another example, if the received missing data packets are received before a retransmission of the missing data packets and the missing data packets are associated with a time-sensitive or streaming application, the receiving unit does not forward the received missing data packets or holes to the upper layer because their priority has been lowered due to their delayed receipt.

In another example, if the received missing data packets are received after a retransmission of the missing data packets is received from the sending unit and forwarded to the upper layer, the received missing data packets are discarded to avoid duplicate forwarding.

Example methodologies for determining the initial dynamic time period (step S290) for the timer and adjustments to the dynamic time period (step S285) will now be described in greater detail.

Example Dynamic Timer Calculation

An example of calculating the initial dynamic time period for the timer in step S290 and calculating adjustments to the dynamic time period for the timer in step S285 will now be described in greater detail. In the following example, terms and variables referring to units of time will be assumed to be referring to milliseconds (ms). Also, the following terminology will be used:

- a "hole" is a missing data packet sent by the sending unit which finally arrives at the receiving unit;
- a "hole_duration" is a time duration between detecting a missing data packet and reception of the missing data packet or hole;
- an "ave_hole_duration" is an average of the hole_durations for a plurality of holes;
- a "hole—variation" is a variance (e.g., a jitter) for the hole—durations of the plurality of holes;
- a duration difference D for a given hole will hereinafter be defined as $$D=|\text{hole\_duration}-\text{avg\_hole\_duration}| \qquad \text{Equation 1}$$

Further, as discussed above with respect to step S285 of FIG. 2, the calculations described below are triggered (e.g., for a first instantiation or subsequent instantiations) when a hole is received. Accordingly, when an ith hole is received, the calculations are performed for the ith time, an ith-1 time (e.g., for calculations which require a separate initial calculation in response to a first hole), etc., except for initial value calculations (e.g., which are only calculated for the first or initial hole).

With the above assumptions, the dynamic time period ("Dynamic_Timer_Period") for the timer is set to an initial or default level (e.g., an upper bound or Dynamic_Timer_Upper_Bound) in step S290. Thereafter, the Dynamic_Timer_Period is calculated/adjusted in S285 by $$\text{Dynamic\_Timer\_Period}=\text{MIN}(\text{avg\_hole\_duration}+\omega*\text{hole\_variation}, \text{Dynamic\_Timer\_Upper\_Bound}) \qquad \text{Equation 2}$$

wherein MIN( ) evaluates to the lower of the expressions (i) [avg_hole_duration+w*hole_variation] and (ii) [Dynamic_Timer_Upper_Bound], with (ii) being an upper threshold timer value selected by a system designer; and $\omega$ is a weight factor (e.g., a constant value) used for weighting the hole_variation in the dynamic time period calculation of step S285. The weight factor $\omega$ is set by the system designer to maintain a probability that the hole_duration is greater than the Dynamic_Timer_Period less than a probability threshold (e.g., a relatively small value determined by the system designer), as expressed by $$\text{Probability (hole\_duration>Dynamic\_Timer\_Period)} < \epsilon \qquad \text{Equation 3}$$

wherein $\epsilon$ denotes the probability threshold.

Further, the avg_hole_duration of Equation 2 is initialized to a first available hole_duration (e.g., for a first hole), and thereafter is updated for each subsequent hole or ith hole in accordance with $$\text{avg\_hole\_duration}[i]=(1-T_0)*\text{avg\_hole\_duration}[i-1]+(1/T_0)*\text{hole\_duration}[i] \qquad \text{Equation 4}$$

wherein $T_0$ is a first time constant determined by a system designer and i is an integer greater than or equal to 2.

Referring again to Equation 2, the hole_variation is initialized (e.g., for a first hole) to half of a first available hole_duration, and thereafter is updated for each subsequent hole or ith hole in accordance with $$\text{hole\_variation}[i]=(1-T_1)*\text{hole\_variation}[i-1]+(i/T_1)*D[i] \qquad \text{Equation 5}$$

wherein $T_1$ is a second time constant determined by a system designer, i is an integrer greater than or equal to 2, and D[i] may be expressed by $$D[i]=|\text{hole\_duration}[i]-\text{avg\_hole\_duration}[i-1]| \qquad \text{Equation 6}$$

Accordingly, in example embodiments of the present invention, the receiving unit may dynamically calculate the time period for the timer in step S285 of FIG. 2 so as to increase system performance by adapting the dynamic time period of the timer in response to changing operating conditions.

Example embodiments of the present invention being thus described, it will be obvious that the same may be varied in many ways. Such variations are not to be regarded as a departure from the example embodiments of the invention, and all such modifications are intended to be included within the scope of the invention.

We claim:

1. A data packet receiving method to dynamically calculate a time period for a receiving unit to wait for missing data packets, comprising:
   determining, at the receiving unit, whether a received data packet is received out of an expected order; and
   dynamically calculating, at the receiving unit, a dynamic time period to wait for one or more missing data packets, prior to any non-acknowledgment (NACK) being sent on behalf of the one or more missing packets, based at least in part on an expected time of receiving the one or more missing data packets if the determining step determines a received packet is out of the expected order
   wherein the dynamic time period begins once the determining step determines a received packet is out of the expected order.

2. The method of claim 1, further comprising:
   buffering received out of expected order data packets;
   outputting the received out of expected order data packets from the buffer if the calculated dynamic time period expires.

3. The method of claim 2, further comprising:
   outputting the received out of expected order data packets from the buffer together with the missing data packets if the missing data packets are received before the calculated dynamic time period expires.

4. The method of claim 2, further comprising:
   sending a non-acknowledgment (NACK) for at least one of the missing data packets after the outputting step.

5. The method of claim 2, further comprising:
   outputting the received out of expected order data packets from the buffer together with the missing data packets if the missing data packets are received after the calculated dynamic time period expires.

6. The method of claim 1, wherein the calculating step calculates the calculated dynamic time period based on an average duration that missing data packets are missing.

7. The method of claim 6, wherein the calculating step calculates the calculated dynamic time period based on the average duration and a variance in durations that missing data packets are missing.

8. The method of claim 7, wherein the calculating step determines the variance as a sum of a previous variance times (1−T) and a differential times (1/T), wherein T is a time constant and the differential equals an absolute value of a duration that a most recent missing data packet was missing minus a previous average duration.

9. The method of claim 7, wherein the calculating step calculates the calculated dynamic time period based on the average duration, the variance, and an upper bound on the calculated dynamic time period.

10. The method of claim 9, wherein the calculating step calculates the calculated dynamic time period as a minimum of (i) the average duration plus a weight factor value times the variance, and (ii) the upper bound.

11. The method of claim 1, wherein the calculating step calculates the calculated dynamic time period based on a weighted average duration that missing data packets are missing.

12. The method of claim 11, wherein the calculating step calculates the calculated dynamic time period based on the weighted average duration and a variance in the durations that missing data packets are missing.

13. The method of claim 12, wherein the calculating step determines the weighted average duration by adding a previous weighted average duration times (1−T1) to a duration that a most recent missing packet was missing times (1/T1), where T1 is a first time constant.

14. The method of claim 13, wherein the calculating step determines the variance as a sum of a previous variance times (1−T2) and a differential times (1/T2), wherein T2 is a second time constant and the differential equals an absolute value of a duration that a most recent missing data packet was missing minus a previous average duration.

15. The method of claim 12, wherein the calculating step determines the variance as a sum of a previous variance times (1−T) and a differential times (1/T), wherein T is a time constant and the differential equals an absolute value of a duration that a most recent missing data packet was missing minus a previous average duration.

16. The method of claim 11, wherein the calculating step calculates the calculated dynamic time period based on the weighted average duration, a variance, and an upper bound on the calculated dynamic time period.

17. The method of claim 16, wherein the calculating step calculates the calculated dynamic time period as a minimum of (i) the weighted average duration plus a weight factor value times the variance, and (ii) the upper bound.

18. The method of claim 11, wherein the calculating step determines the weighted average duration by adding a previous weighted average duration times (1−T1) to a duration that a most recent missing packet was missing times (1/T1), where T1 is a first time constant.

* * * * *